US006276509B1

(12) United States Patent
Schuster et al.

(10) Patent No.: US 6,276,509 B1
(45) Date of Patent: Aug. 21, 2001

(54) SORTING DEVICE FOR FLAT, LETTER-LIKE POSTAL ITEMS

(75) Inventors: Rudolf Schuster, Kirchheim; Fridtjof Reinerth, Fürstenfeldbruck, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/582,537

(22) PCT Filed: Dec. 3, 1998

(86) PCT No.: PCT/DE98/03560

§ 371 Date: Jun. 28, 2000

§ 102(e) Date: Jun. 28, 2000

(87) PCT Pub. No.: WO99/34936

PCT Pub. Date: Jul. 15, 1999

(30) Foreign Application Priority Data

Dec. 30, 1997 (DE) ............................................. 197 58 199

(51) Int. Cl.[7] ..................................................... B65G 47/10

(52) U.S. Cl. ................................. 198/370.02; 198/468.9; 209/900

(58) Field of Search .................................... 198/359, 890, 198/468.01, 468.2, 468.6, 468.9, 602, 370.02; 209/900, 509, 584; 414/267, 280

(56) References Cited

U.S. PATENT DOCUMENTS

| | | | | |
|---|---|---|---|---|
| 4,592,462 | * | 6/1986 | Mojden et al. | 198/468.9 X |
| 4,629,057 | * | 12/1986 | Jensen et al. | 198/468.9 X |
| 4,688,678 | * | 8/1987 | Zue et al. | 209/900 X |
| 5,385,243 | | 1/1995 | Jackson et al. | 209/509 |
| 5,419,457 | * | 5/1995 | Ross et al. | 209/900 X |
| 5,433,325 | * | 7/1995 | Levaro et al. | 209/900 X |
| 5,718,321 | | 2/1998 | Brugger et al. | 198/359 |
| 5,959,868 | | 9/1999 | Oppliger et al. | 198/468.6 X |

FOREIGN PATENT DOCUMENTS

| | | |
|---|---|---|
| 0 640 409 | 3/1995 | (EP) . |
| 0 708 691 | 2/1997 | (EP) . |
| 2 676 941 | 12/1992 | (FR) . |
| WO 97/09132 | 3/1997 | (WO) . |

* cited by examiner

*Primary Examiner*—James R. Bidwell
(74) *Attorney, Agent, or Firm*—Schiff Hardin & Waite

(57) ABSTRACT

A sorting device is provided with output stations for containers along a sorting path, which containers accept the sorted unit load. A conveying path extends next to the container row, on which conveying path the empty containers are supplied and the full containers are transported off. A transfer device can be moved via the conveying path and is provided with a telescopic boom for the automatic container change between the output stations and the conveying path.

9 Claims, 2 Drawing Sheets

SORTING DEVICE FOR FLAT, LETTER-LIKE POSTAL ITEMS

FIELD OF THE INVENTION

The invention relates to a sorting device for flat letter-like postal matter, whereby output stations with containers for accepting the sorted postal matter are arranged in series along a sorting path of the sorting device.

BACKGROUND OF THE INVENTION

For example, EP-C-0 708 691 discloses such a device. It describes and shows a sorting device, whereby endlessly rotating sorting compartments pass through a plurality of sorting paths arranged parallel to one another, on top of one another and in series. Below the sorting compartments in a, the acceptance containers for the sorted postal matter are arranged in series along the sorting paths. To replace the full containers with empty ones, a conveying path is provided between the two sorting paths of respectively one story, wherein the filled containers are transported in the direction of the sorting paths relative to the front of the sorting device. This ensues in that the full container, proceeding from the outside of the apparatus, is manually pushed onto the conveyor toward the back. The empty containers are also supplied by means of conveyors, which are arranged on the outside of the sorting device along the container rows. Thus, the empty containers are made available along the entire sorting path and can be inserted into the gap that has become free with small manual outlay.

Sorting devices of the company CGA (Alcatel) also comprise a conveying path for transporting off the full containers; however, this conveying path is guided along the outside of the sorting device. An operating cart moves below the container rows and is provided with a transfer device by means of which the full containers are placed upon the conveying path. Besides, the operating cart can accept a limited number of empty containers and, by means of a lifting device, can automatically insert them into the output station that has become free.

Further, WO 97/09132 A1 discloses a sorting device, whereby not only the filled containers but also the empty containers are transported on a conveying path and whereby a transfer device can be moved along the sorting path, which transfer device is provided with transfer means for purposes of automatically inserting the containers into the output stations and for purposes of automatically taking the containers from the output station in the conveying path.

SUMMARY OF THE INVENTION

The invention is based an object of reducing the manufacturing and operating outlay for the sorting device.

In accordance with the present invention, it is thereby possible, for all changing processes, to provide only one common conveying path for both sorting paths. This reduces the device outlay and the space outlay. The operating staff must observe and operate only one path.

In an embodiment, the present invention comprises a sorting device for flat letter-like postal matter that comprises at least one conveying path, a sorting path, a further sorting path, at least one transfer device and a plurality of output stations. The output stations include a plurality of containers for accepting sorted postal matter. The containers are arranged in a series along the sorting path. The filler containers can be taken from the output stations and transported off of the sorting device. The output stations that have become free of containers can be equipped with empty containers and the at least one conveying path is capable of supplying or, respectively, transporting the empty containers off of the sorting device or, respectively, the full containers off of the sorting device. The at least one conveying path also extends along the output stations. Therefore, both filled containers and empty containers can be transported in the conveying path. The at least one transfer device can be moved along the sorting path. The transfer device comprises a transfer means for purposes of automatically transferring containers from the conveying path to the output station or, respectively, for transferring containers from the output station to the conveying path. The sorting path and the further sorting path are arranged parallel to one another with the conveying path extending therebetween. The transfer means is operable for both the sorting path and the further sorting path.

In an embodiment, the transfer means comprises at least one telescopic boom for operating on the container row disposed in the sorting path and the further sorting path.

In an embodiment, the transfer device can be moved between the two sorting paths.

In an embodiment, a free intermediate space is disposed between the two sorting paths and wherein the transfer means is fashioned as at least one narrow grab arm which can be linearly moved into the free intermediate space. The grab arm comprises a grab means for grabbing the containers.

In an embodiment, the free intermediate space is disposed between the sorting components and the containers that are situated in the output stations and wherein the grab arm is moved into the free intermediate space and further wherein the grab means is adjustable such that the grab means can be moved laterally past the containers without contacting the containers.

In an embodiment, the grab arm is a boom that can be telescopically extended.

In an embodiment, the telescopic grab arm can be moved between the sorting path and the further sorting path and wherein the grab arm and grab means are fashioned for purposes of inserting and withdrawing empty containers or, respectively, filled containers from the sorting path and the further sorting path.

In an embodiment, the transfer device is provided with a lifting means for purposes of lifting the containers.

In an embodiment, the lifting means comprises finger-like grab means and wherein the containers comprise grab shapes for engaged by the finger-like grab means.

In an embodiment, all transfer processes can be carried out by means of one and the same transfer means.

In an embodiment, it is possible to carry out all changing processes at a sorting level with one single transfer device, so that a low manufacturing outlay is required.

In an embodiment, the work space required for the automatic container change is reduced to a minimum. It is thereby possible to arrange the transfer device in the tight lane between the two sorting paths and to keep the outsides of the sorting device correspondingly open.

It is particularly advantageous that the actual sorting path with the rotating sorting compartments and the output stations lying therebelow need not be modified for the engagement of the transfer means. It is thereby possible to fashion the sorting device, without significant reconstructions, for the manual container change or the automatic container change depending on the desire of the customer. As a result of the small spatial requirement for the transfer device and for the changing processes, it is also possible to arrange two transfer devices in two stories lying on top of one another and to allocate respectively two sorting stories lying on top of another sorting device.

In an embodiment, only one grab arm is required, which is directed toward the center of the container. The grab arm can be kept particularly slim, since it is telescopically fashioned. It is thereby possible to keep the intermediate space between the sorting compartments and the containers correspondingly narrow.

In an embodiment, the telescopic arm can be extended toward both sides in the same way and therefore has access to both container rows.

In an embodiment, it is possible to grab and lift the containers in a simple way. The finger-like grab means can be pivoted so strongly that they remain within the contour of the grab arm in the open state. Therefore, they are pushed past the container in a contactless manner when the grab arm extends. After the grab arm has been extended up to its end position, the grab means can be pivoted out up to a point at which they engage behind the container and lift the container at the corresponding grab shapes without additional mechanical means being necessary for the lifting process.

Other objects and advantages of the present invention will become apparent from reading the following detailed description and appended claims, and upon reference to the accompanying drawings.

BRIEF DESCRIPTION OF THE DRAWING

The invention is subsequently explained in greater detail on the basis of an exemplary embodiment shown in the drawing.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
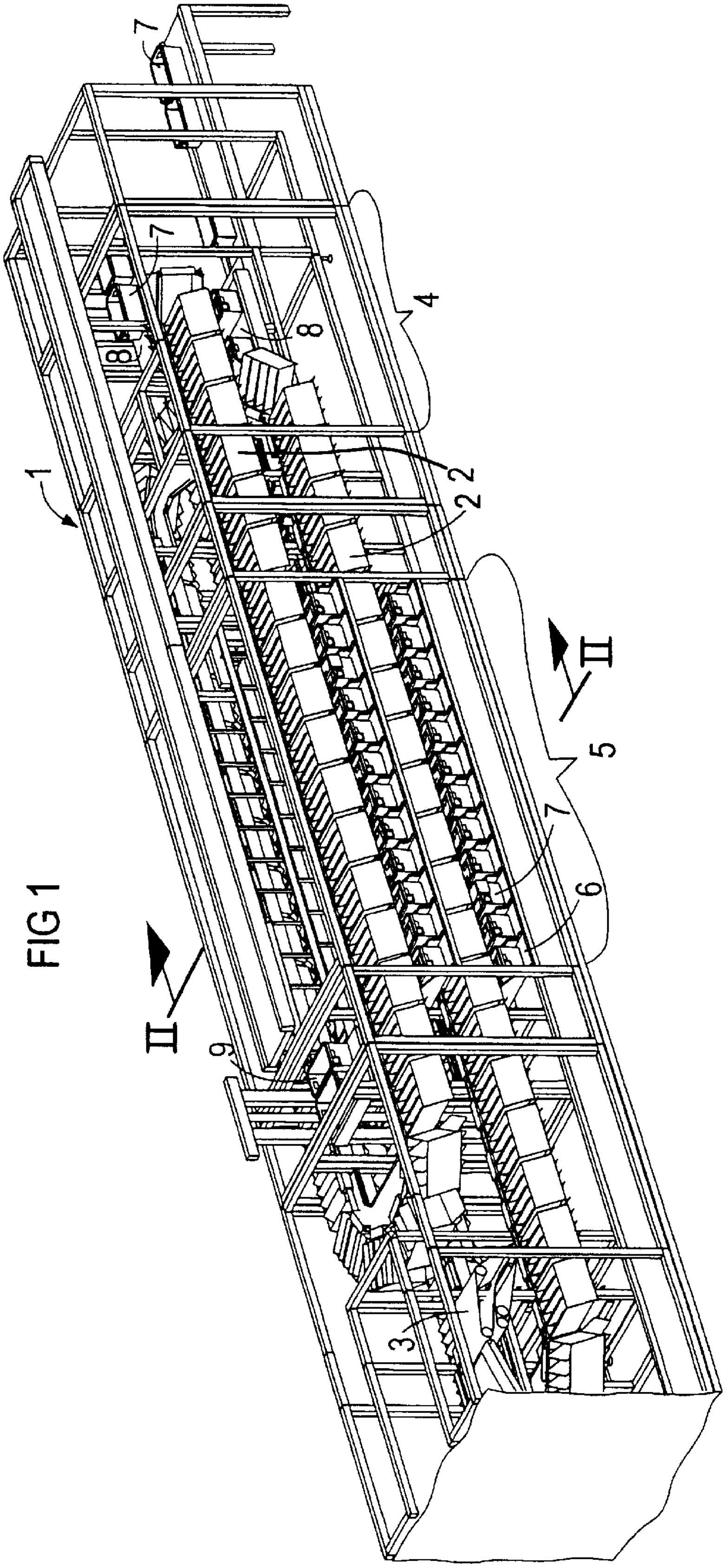
FIG. 1 is a perspective view of a sorting device for letter-like postal matter with rotating sorting compartments and containers for accepting the sorted postal matter.
Figure 2:
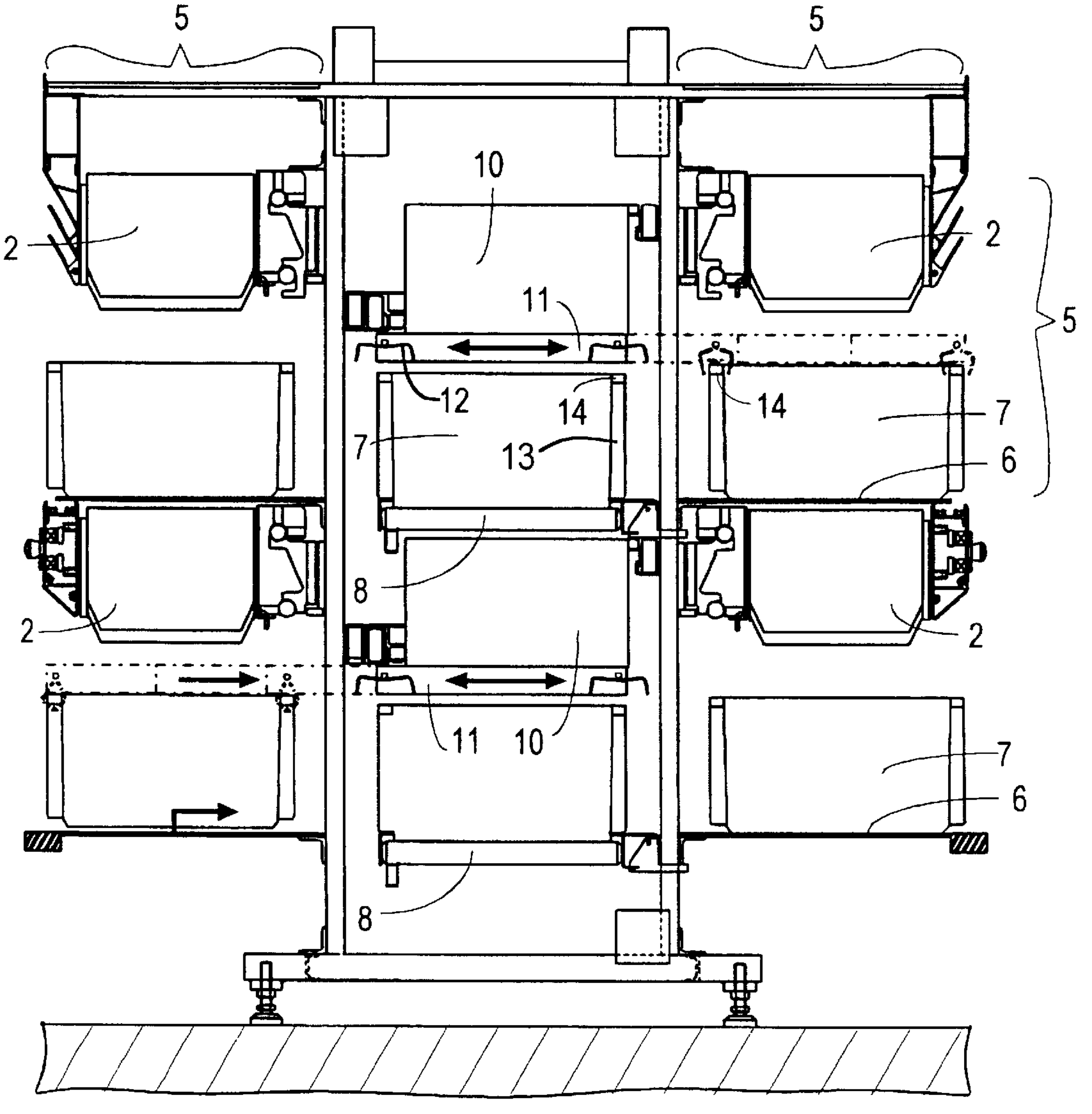
FIG. 2 is a cross sectional view through the sorting device along the line II—II in FIG. 1.

According to the FIGS. 1 and 2, a sorting device I is provided with sorting compartments 2 rotating in a chain-like manner, which are filled with unsorted postal matter by means of an input device 3. The sorting compartments, via a height-adjustable deflection 4, pass two stories with respectively two sorting paths 5 that extend along the front and back longitudinal sides of the oblongly fashioned sorting device 1.

Output stations that are equipped with respectively one exchangeable container 7 are arranged below the sorting compartments 2 along the sorting paths 5. The sorting compartments 2 are provided with flaps (not shown), which can be controllably opened respectively above one of the output stations 6, so that the respective postal matter can fall into the container 7 lying therebelow. It is thereby possible to sort the entire postal matter into the containers allocated to the target addresses.

Middle conveying paths 8, upon which the filled containers 7 are placed and transported to the face side of the sorting device 1 that is opposite the input device, extend between the two container rows of both stories. The conveying path 8 does not only serve the purpose of transporting off the full containers 7, but also serves the purpose of supplying the empty containers 7 to the output stations 6. The empty containers 7, as required, are automatically inputted from the storage 9 into the conveying path 8, whereby the storage 9 is arranged on the side of the sorting paths facing the input device 3.

FIG. 2 shows the means for the container change in greater detail. The conveying path 8 extends between the sorting paths 5 approximately at the level of the output stations 6. It is thereby possible to carry out the container change with a low lifting motion. A cart-like transfer device 10 can be moved above the containers that are situated on the conveying path 8 transversely relative to the longitudinal direction of the conveying path 8, which cart-like transfer device 10 is provided with transfer means 11 on its bottom side for the container change between the conveying path 8 and the output stations. The transfer means 11 are fashioned as a telescopic boom that, according to the horizontal arrows, can be extended toward both sides of the conveying path 8. The boom, which is fashioned as a narrow grab arm, comprises downwardly directed finger-like grab means 12, which can be positioned via sidewalls 13 of the containers. These sidewalls 13 are provided with handle-like grab shapes 14 that can be encompassed by means of the grab elements 12.

The grab means 12 are fashioned such that they form stage-like leading ramps given grabbing of the grab shapes 14. When the grab fingers pivot together, these effect that the respective container 7 can be easily lifted. The boom 11 is fashioned so slim that it can be moved into an intermediate space between the sorting compartments 2 and the containers 7 that are situated in the output stations. The grab means 12 are spread so far that they are situated within the boom contour.

The transfer means 11 of the upper transfer means 10 (in the dash-dotted illustration) are pushed out toward the right up to a point at which the grab means 12 are situated over the grab shapes 14 of a filled container 7, whereby the grab means 12 are already half closed. The transfer means 11 of the lower transfer device 10 (in the dash-dotted illustration) are extended beyond the opposite container row. Here, the grab means 12 have already fully grabbed and slightly lifted the container 7. This container (according to the bent arrow) can now be moved beyond the conveying path 8 and can be placed upon the grab means 12 after they have been opened.

For example, the conveying path 8 is provided with driven rollers that enable the further transport of the placed containers 7. After the full container 7 has been transported further from its placement position, an empty container, in reversed order, can be taken from the conveying path 8 by means of the transfer means and can be inserted into the output station that has become free. The transfer device 10 and the storage 9 shown in FIG. 1 are controlled such that an empty container 7 is already available at the transfer device 10 given every changing process.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. A sorting device for flat letter-like postal matter, comprising:

at least one conveying path, a sorting path, a further sorting path, at least one transfer device and a plurality of output stations having a plurality of containers for accepting sorted postal matter, the plurality of containers being arranged in a series along at least one of the sorting path and the further sorting path, one output station extending beneath each of the sorting path and further sorting path, filled containers being capable of being taken from the output stations and transported off of the sorting device and the output stations that have become free of containers being capable of being filled with empty containers and the at least one conveying path is capable of supplying or, respectively, removing empty containers or, respectively, supplying or removing full containers, the at least one conveying path extending along the output stations, filled containers and empty containers being transported in the conveying path and, the at least one transfer device being moved along the sorting path and the further sorting path, the transfer device including a transfer means for automatically transferring containers from the sorting path and further sorting path to the conveying path and to the output stations or, respectively, for purposes of transferring containers from the output stations to the conveying path, the sorting path and the further sorting path being arranged parallel to one another, the conveying path extending between the sorting path and the further sorting path, and the transfer means being operable for both rows of containers disposed in the sorting path and the further sorting path.

2. A sorting device as claimed in claim 1, wherein the transfer device comprises at least one telescopic boom for operating on container rows disposed in the sorting path and the further sorting path.

3. A sorting device as claimed in claim 2, wherein the transfer device is constructed to be capable of being moved between the sorting path and the further sorting path.

4. A sorting device as claimed in claim 1, further comprising:

means defining a free intermediate space disposed between the sorting path and the further sorting path, the transfer means includes at least one narrow grab arm which is movable linearly along the free intermediate space, the grab arm includes a grab means for grabbing containers disposed in at least one of the sorting path and the further sorting path.

5. A sorting device as claimed in claim 4, wherein the free intermediate space is disposed between the sorting path and the further sorting path, the sorting path and further sorting path pass through the output station, the grab arm is moved into the free intermediate space, and the grab means is adjustable such that the grab means is capable of being moved laterally past the containers without contacting the containers.

6. A sorting device as claimed in claim 5, wherein the grab arm is a boom that is telescopically extendable.

7. A sorting device as claimed in claim 6, wherein the telescopic grab arm can be moved between the sorting path and the further sorting path and wherein the grab arm and the grab means are fashioned for purposes of inserting and withdrawing empty containers or, respectively, filled containers from both the sorting path and the further sorting path.

8. A sorting device as claimed in claim 7, wherein the transfer device includes a lifting means for lifting the containers.

9. A sorting device as claimed in claim 8, wherein the lifting means includes finger-like grab means, and the containers comprise grab shapes for being engaged by the finger-like grab means.

* * * * *